May 10, 1927.  1,628,451
C. A. BRUST
COTTON AND HULL SEPARATOR
Filed Sept. 23, 1926   2 Sheets-Sheet 1
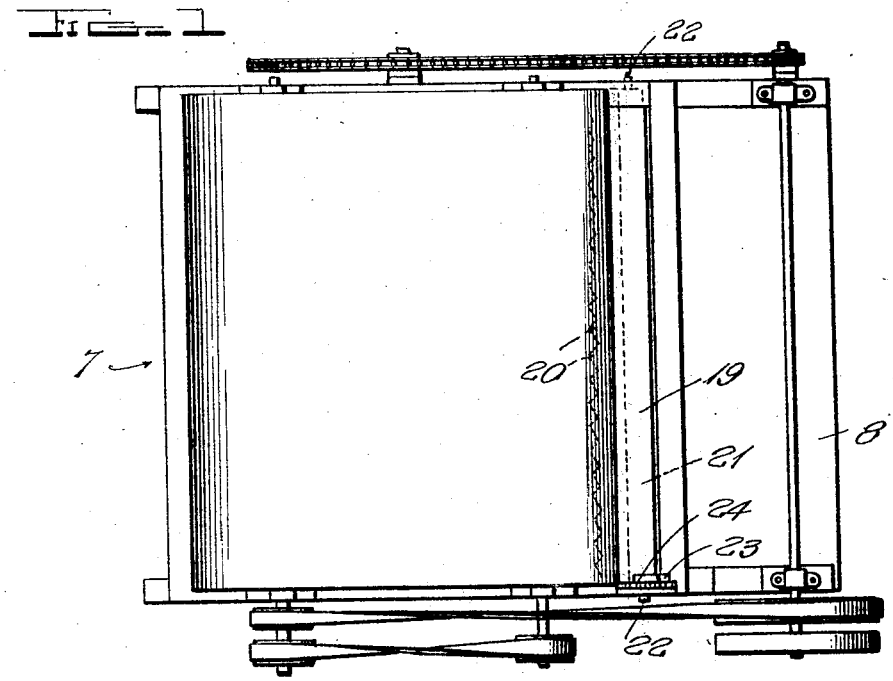
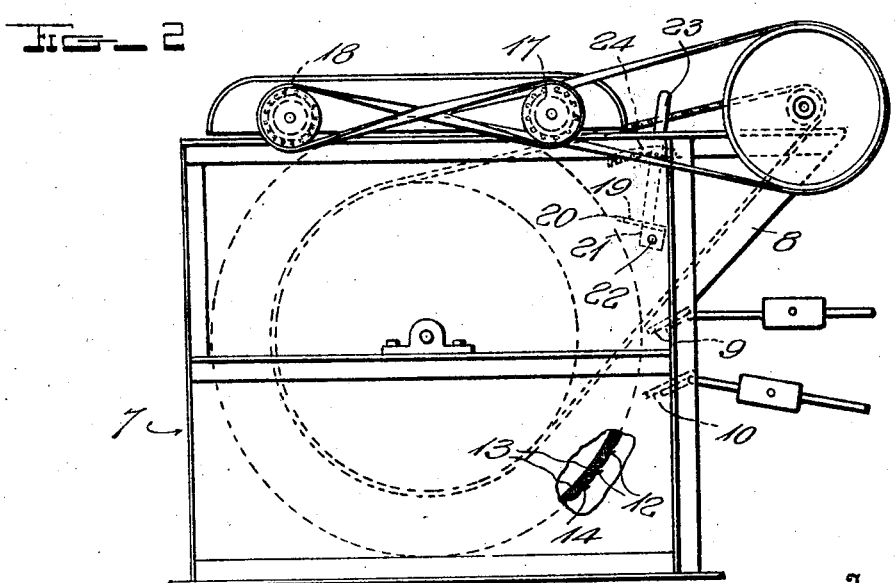
Inventor
C. A. Brust,

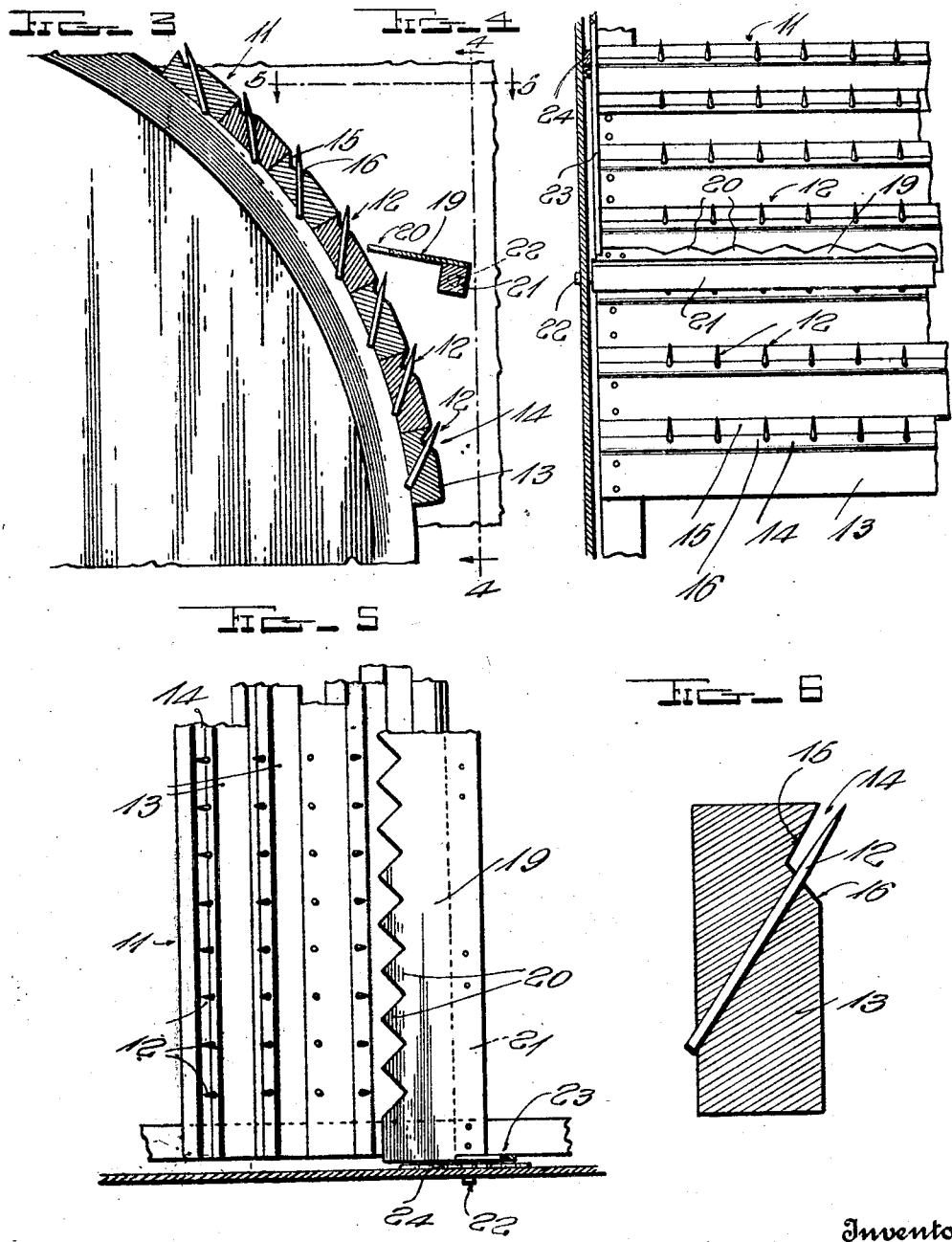

Patented May 10, 1927.

1,628,451

UNITED STATES PATENT OFFICE.

CHARLES A. BRUST, OF MEMPHIS, TENNESSEE.

COTTON AND HULL SEPARATOR.

Application filed September 23, 1926. Serial No. 137,327.

The invention relates to improvements in cotton and hull separating machines of the general type disclosed in my U. S. Patent No. 1,093,106 of April 14, 1914. In this type of machine, a spiked drum is provided for conveying the cotton and hulls to a knocker roll by which the hulls are returned, the drum then serving to carry the cotton to a brushing roll by means of which it is removed.

It is one object of the invention to provide a new and improved machine in which the conveying drum is provided with a novel relation of grooves and spikes for properly and advantageously handling the bolls and the cotton.

Another aim is to provide a toothed plate at the periphery of the drum for the purpose of crushing some of the hulls and returning them before they reach the knocker roll. Thus, this roll is relieved of a great deal of work and the capacity of the machine is increased.

With the foregoing in view, the invention resides in the novel subject matter hereinafter described and claimed, the description being supplemented by the accompanying drawings.

Fig. 1 is a top plan view of a machine constructed in accordance with the present invention.

Fig. 2 is a side elevation.

Fig. 3 is an enlarged vertical sectional view through a portion of the drum and the toothed plate employed for crushing and returning some of the hulls before they reach the knocker roll.

Fig. 4 is a fragmentary vertical section partly in elevation, as indicated by line 4—4 of Fig. 3.

Fig. 5 is a fragmentary horizontal section partly in elevation, substantially on line 5—5 of Fig. 4.

Fig. 6 is an enlarged vertical section cut transversely through one of the slats at the periphery of the drum, showing more clearly the relation of the grooves and spikes with which each slat is provided.

In the drawings above briefly described, the numeral 7 designates the general body structure of the machine, provided with a hopper 8 to receive the mixed hulls and cotton, cotton seed also being usually mixed with said hulls and cotton. Main and auxiliary hull boards 9 and 10 are shown mounted at the lower end of this hopper, which end opens toward the periphery of a conveying drum 11 having peripheral spikes 12 which are disposed at acute angles to the periphery of the drum and slant in the direction in which the drum rotates. As customary, the drum 11 has its peripheral portion formed from a plurality of slats 13, in the preferred form of construction, and each of these slats is provided with a longitudinal groove 14 of V-shape, the two walls of said groove which diverge to the periphery of the drum being designated 15 and 16 for future reference. The effective portions of the spikes 12 are disposed in the grooves 14 of the drum 11, said spikes projecting from the walls 16 of said grooves and being disposed in spaced, substantially parallel relation with the walls 15. These spikes project somewhat beyond the grooves as will be clear from Figs. 3 and 6.

The active portions of the spikes 12 pick up the cotton from the hopper 8 and this cotton will somewhat more than fill the grooves 14, whereas the hulls will not enter these grooves but will be impaled upon the outer extremities of the spikes. They may thus be easily knocked from these spikes and returned, while the cotton will remain in the grooves until it is brushed therefrom.

At 17 I have shown a toothed knocker roll in dotted lines and have similarly illustrated a brushing roll at 18, the rolls which the dotted lines represent being clearly shown in Fig. 4 of Patent No. 1,093,106, above referred to. Both of these rolls and the drum 11 are of course driven by any suitable means such as an arrangement of pulleys, belting and shafting.

In the old machines, the knocker roll 17 has entirely performed the duty of knocking the hulls from the spikes 12 and returning them, but I have found that I can increase the capacity of the machine by providing a toothed plate 19 at the periphery of the drum 11 with its teeth 20 disposed toward the latter, this toothed plate serving to crush the hulls and return some of them before they reach the knocker roll 17. Thus, the latter is relieved of a great deal of work and the capacity of the machine is increased. This increased capacity is due also to a large extent, to the provision of the large grooves 14 which receive the cotton and carry it to the brushing roll 18, by which it is removed.

The plate 19 is, in the present disclosure, secured upon a transverse shaft 21 located between the hull board 9 and the knocker roll 17, the ends of said shaft being pivotally mounted at 22 so that by turning this shaft, the teeth 20 may be moved toward or from the drum 11, as conditions may require. For so turning the shaft, I have illustrated a hand lever 23 which however is normally held against movement by a rack or other desired means 24.

The operation of the machine would probably be clear to those skilled in the art without further explanation, but may be briefly given as follows: The cotton, hulls and seed as they come from the gin are dumped into the hopper 8 so that as drum 11 rotates, the spikes 12 pick up the cotton and the hulls. The cotton finds its way into the grooves 14 and somewhat more than fills them, whereas the hulls will not enter said grooves, but are impaled upon the outer ends of the spikes 12. As the hulls are brought into contact with the teeth 20 of the plate 19, most of them are crushed and some of them are knocked from the spikes 12 and returned, and those which are not removed by this plate, are knocked from the spikes 12 by the knocker roll 17. The cotton remains in the grooves 15 until it is brushed therefrom by the brushing roll 18.

By the improvements herein defined, that is, the provision of the grooves 14 and the novel relation of the spikes 12 therewith, and the provision of the toothed plate 19, the efficiency and capacity of the machine are greatly increased.

The details disclosed are preferably followed, but within the scope of the invention as claimed, variations may of course be made.

I claim:—

1. In a cotton and hull separating machine, a body structure, a cotton conveying drum rotatably mounted in said body structure, said drum having spaced longitudinal grooves in its periphery to receive the cotton but not the hulls, cotton-conveying and hull-impaling spikes arranged in said grooves with their outer ends projecting therefrom and beyond the periphery of the drum, and means for knocking the cotton hulls from said spikes.

2. A structure as specified in claim 1; each of said grooves having two sides which diverge to the outer face of the drum, the spikes of each groove projecting from one of said sides and being in spaced substantially parallel relation with the other of said sides.

3. In a cotton and hull separating machine, a body structure, a cotton conveying drum rotatably mounted in said body structure, said drum having spaced longitudinal grooves in its periphery, to receive the cotton but not the hulls, cotton-conveying and hull-impaling spikes arranged in said grooves, and a toothed plate mounted stationarily adjacent the periphery of the drum and having its teeth disposed toward the latter, whereby the hulls are crushed and some of them knocked from the drum and spikes.

4. In a cotton separating machine, a body structure, a spiked conveyor drum rotatably mounted transversely therein, a knocking roll for knocking the cotton hulls from the spikes of said drum, a transverse shaft pivotally mounted in said body structure adjacent to the periphery of the drum, a toothed plate secured to said shaft and having its teeth disposed toward said drum, means for turning said shaft and plate whereby the teeth on the latter are moved toward or from the drum, and means for holding said shaft and plate in adjusted positions.

In testimony whereof I have hereunto affixed my signature.

CHARLES A. BRUST.